US 6,659,894 B2

(12) United States Patent
Kern et al.

(10) Patent No.: US 6,659,894 B2
(45) Date of Patent: Dec. 9, 2003

(54) VARIABLE PITCH SHEAVE ASSEMBLY FOR FAN DRIVE SYSTEM

(75) Inventors: Robert D. Kern, Waukesha, WI (US); Gerald C. Ruehlow, Oconomowac, WI (US); Bret Baird, North Prairie, WI (US); Allen Gillette, Muskego, WI (US)

(73) Assignee: Generac Power Systems, Inc., Waukesha, WI (US)

( * ) Notice: Subject to any disclaimer, the term of this patent is extended or adjusted under 35 U.S.C. 154(b) by 0 days.

(21) Appl. No.: 09/976,716

(22) Filed: Oct. 12, 2001

(65) Prior Publication Data

US 2003/0013567 A1 Jan. 16, 2003

Related U.S. Application Data

(63) Continuation-in-part of application No. 09/904,265, filed on Jul. 12, 2001, which is a continuation-in-part of application No. 09/904,421, filed on Jul. 12, 2001.

(51) Int. Cl.[7] .............................. F16H 55/52; F16H 9/16; F16H 55/78; F01P 7/02
(52) U.S. Cl. ............................. 474/32; 474/34; 474/22; 123/41.12; 123/198
(58) Field of Search ..................... 474/32, 34, 33, 474/39, 70, 8, 41, 69, 42, 46, 22; 29/892.1; 123/195, 198, 41.12, 41.11

(56) References Cited

U.S. PATENT DOCUMENTS

| 2,219,184 | A |   | 10/1940 | Herman ........................ 74/286 |
| 2,732,831 | A |   | 1/1956 | Dodge ........................ 123/41.12 |
| 2,875,746 | A | * | 3/1959 | Brice et al. .............. 123/195 A |
| 2,900,832 | A |   | 8/1959 | Snartemo ................. 74/230.17 |
| 2,917,937 | A |   | 12/1959 | Dodge .......................... 74/336 |
| 2,962,910 | A |   | 12/1960 | Wolfram ................... 74/230.17 |
| 2,995,295 | A | * | 8/1961 | Day .............................. 474/46 |
| 3,071,019 | A |   | 1/1963 | Metzler ..................... 74/230.17 |
| 3,680,404 | A |   | 8/1972 | Firth ......................... 74/230.17 |
| 3,853,098 | A | * | 12/1974 | Ishikawa et al. .......... 123/41.11 |
| 3,872,842 | A |   | 3/1975 | Medley ..................... 123/41.12 |
| 3,894,521 | A | * | 7/1975 | Sakasegawa et al. ..... 123/41.12 |
| 4,056,987 | A |   | 11/1977 | Hoffmann ..................... 74/689 |
| 4,215,658 | A | * | 8/1980 | Smith et al. ............. 123/198 C |
| 4,725,258 | A |   | 2/1988 | Joanis, Jr. ..................... 474/33 |
| 5,588,325 | A | * | 12/1996 | Green et al. ................ 29/892.1 |
| 5,662,538 | A |   | 9/1997 | Wang ........................... 474/11 |
| 5,897,450 | A |   | 4/1999 | May ............................. 474/32 |
| 6,109,127 | A |   | 8/2000 | Liau ............................ 74/336 |
| 6,129,643 | A |   | 10/2000 | Tamagawa et al. ............ 474/8 |

FOREIGN PATENT DOCUMENTS

DE   3109243 A1 * 12/1982

* cited by examiner

Primary Examiner—Marcus Charles
(74) Attorney, Agent, or Firm—Boyle Fredrickson Newholm Stein & Gratz S.C.

(57) ABSTRACT

A fan drive arrangement and method is provided for facilitating the cooling of engine coolant flowing through a radiator and an engine. The fan drive arrangement includes a variable pitch sheave assembly which moves between a first high speed position and a second low speed position. Variable pitch sheave assembly is interconnected by first and second drive belts to first and second drive pulleys operatively connected to the crankshaft of the engine and by first and second fan belts to corresponding fan pulleys connected to a fan shaft of a fan. Variable pitch sheave assembly includes first and second drive belt receiving grooves for receiving corresponding drive belts therein and first and second fan belt grooves for receiving corresponding fan belts therein. The depths of the fan belt grooves and the drive belt grooves of the variable pitch sheave assembly are varied in response to the temperature of the engine coolant flowing through the radiator so as to vary the fan speed accordingly.

14 Claims, 9 Drawing Sheets

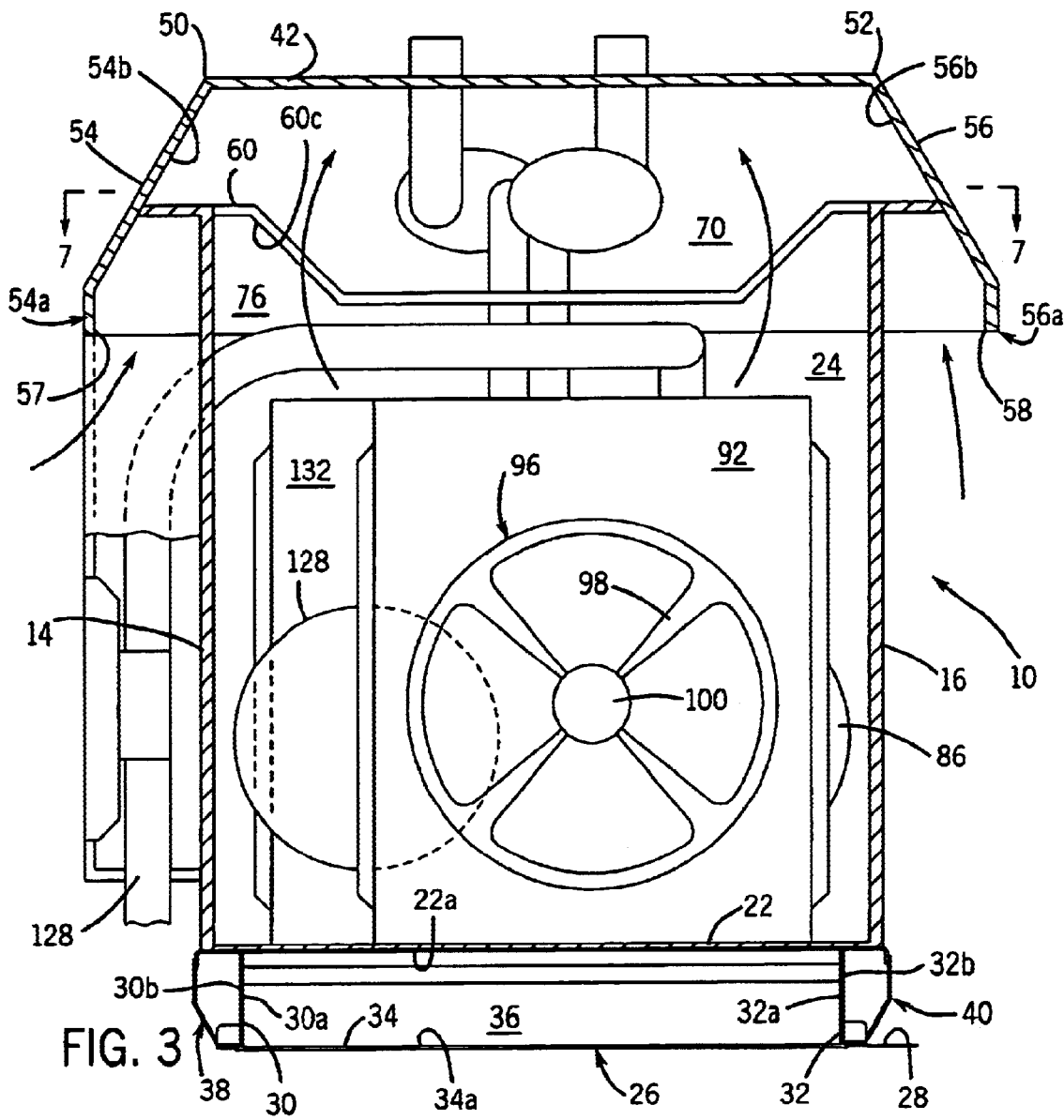
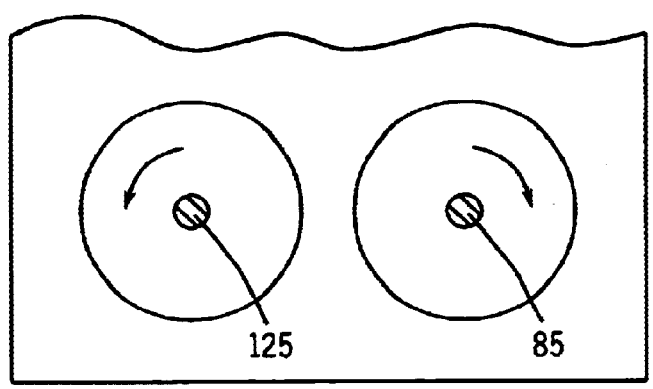
FIG. 3
FIG. 4

VARIABLE PITCH SHEAVE ASSEMBLY FOR FAN DRIVE SYSTEM

RELATED APPLICATIONS

This application is a continuation-in-part of U.S. Ser. No. 09/904,265, filed Jul. 12, 2001 and entitled: "Air Flow Arrangement for Generator Enclosure," and of U.S. Ser. No. 09/904,421, filed Jul. 12, 2001 and entitled: "Generator Structure Incorporating Multiple Electrical Generator Sets."

FIELD OF THE INVENTION

This invention relates generally to engine-driven, electrical generators, and in particular, to a generator structure incorporating a variable pitch sheave arrangement for facilitating the cooling of a radiator of an engine-driven, electrical generator.

BACKGROUND AND SUMMARY OF THE INVENTION

Engine-driven, electrical generators are used in a wide variety of applications. Typically, such electrical generators utilize a single driving engine directly coupled to a generator or alternator through a common shaft. Upon actuation of the engine, the crankshaft thereof rotates the common shaft so as to drive the alternator which, in turn, generates electricity. It can be appreciated that since the engine and the alternator are housed in a single enclosure, a significant amount of heat is generated within the enclosure during operation of the electrical generator.

Heretofore, in order to cool the components of a prior electrical generator, louvers were provided in the walls of the enclosure thereof. A fan, coupled to the crankshaft of the engine, rotates during operation of the electrical generator. The rotating fan draws air into the enclosure through the louvers in the walls and blows air over the components of the electrical generator, including the engine, the alternator, and the radiator. In such a manner, it is intended that the air passing over the components of the electrical generator have a cooling effect on the components during their operation such that the temperatures of the components are maintained below safe operating limits.

While functional under certain conditions, air flow arrangements of prior electrical generators have significant limitations. Typically, the fan used to cool the radiator is rotated at a predetermined, constant speed. It can be appreciated that during start-up of the electrical generator, the temperature of the engine coolant flowing through the radiator is at a minimum. As such, it is unnecessary to rotate the fan at full speed in order to cool the engine coolant flowing through the radiator. As the engine of the electrical generator approaches full operating speed, the temperature of the engine coolant flowing through the radiator increases. Consequently, it becomes necessary for the rotational speed of the engine fan to increase in order for the engine fan to adequately cool the engine coolant flowing through the radiator. As such, it is highly desirable to provide a fan drive structure which provides greater cooling of the radiator as the temperature of the coolant flowing therethrough increases.

Therefore, it is a primary object and feature of the present invention to provide a fan drive system for an electrical generator structure which improves the overall operating efficiency of the same.

It is a further object and feature of the present invention to provide a fan drive system for an electrical generator structure which more economically cools the radiator of the generator structure than prior fan drive systems.

It is a still further object and feature of the present invention to provide a fan drive system for an electrical generator structure which is simple to operate and inexpensive to implement.

In accordance with the present invention, a variable pitch drive sheave is provided for interconnecting first and second fan pulleys operatively connected to a fan by a rotatable fan shaft and first and second rotatable drive pulleys. The fan generates an air flow through a radiator to cool the temperature thereof. The variable pitch drive sheave assembly includes a shaft extending along an axis and having first and second opposite ends. A first outer sheave member is positioned adjacent the first end of the shaft and a second outer sheave member is positioned adjacent the second end of the shaft. An intermediate sheave member is positioned between the first and second ends of the shaft. A first movable sheave member is slidably supported on the shaft between the first outer sheave member and the intermediate sheave member. The first movable sheave member and the outer sheave member defining a first drive pulley groove therebetween for receiving a first drive belt. The first movable sheave member and the intermediate sheave member define a first fan pulley groove therebetween for receiving a first fan belt. The second movable sheave member is slidably supported on the shaft between the second outer sheave member and the intermediate sheave member. The second movable sheave and the second outer sheave member define a second drive pulley groove therebetween for receiving a second drive belt. The second movable sheave member and the intermediate sheave member define a second fan pulley groove therebetween for receiving a second fan belt. The first drive belt operatively connects the first drive pulley groove and the first drive pulley. The second drive belt operatively connects the second drive pulley groove and the second drive pulley. The first fan belt operatively connects the first fan pulley groove and the first fan pulley. The second fan belt operatively connects the second fan pulley groove and the second fan pulley. As described, rotation of the first and second drive pulleys is translated to the first and second fan pulleys.

The drive sheave assembly may include an actuator operatively connected to the shaft for moving the first and second movable sheave members between a first high speed position and a second low speed position. The first and second drive pulley grooves have a first depth when the first and second movable sheave members are in the high speed position and a second depth with the first and second movable sheave members in the low speed position. The first depth of the first and second drive pulleys is greater than the second depth of the first and second drive pulleys. In addition, the first and second fan pulley grooves have a first depth when the first and second movable sheave members are in the high speed position and a second depth when the first and second movable sheave members are in the low speed position. The first depth of the first and second fan pulleys grooves is less than the second depth of the first and second fan pulley grooves. It is contemplated to provide a monitoring device for monitoring the temperature of the radiator. The monitoring device controls movement of the actuator in response to the temperature of the radiator.

In accordance with a further aspect of the present invention, a fan drive arrangement is provided. The fan drive arrangement operatively connects a drive shaft to a fan mounted on a rotatable fan shaft. The fan drive arrangement includes first and second fan pulleys interconnected to the fan shaft. Each drive pulley has a groove therein for receiving a corresponding fan belt. First and second drive pulleys are interconnected to the drive shaft. Each fan pulley has a groove therein for receiving a corresponding drive belt. A variable pitch sheave assembly is also provided. The variable pitch sheave assembly is movable between a first high speed position and a second low speed position and includes a rotatable sheave shaft having first and second opposite ends. A first outer member is fixed to the first end of the sheave shaft and a second outer member is fixed to the second end of the sheave shaft. An intermediate member is fixed to the sheave shaft between the first and second ends thereof. A first slidable member slides along the sheave shaft between the first outer member and the intermediate member. The first slidable member and the first outer member define a first drive pulley therebetween and the first slidable member and intermediate member define a first fan groove therebetween. A second slidable member is slidable along the sheave shaft between the intermediate member and a second outer member. The second slidable member and the second outer member define a second drive groove therebetween and the second slidable member and the intermediate member define a second fan groove therebetween. A first drive belt is seated in the groove in the first drive pulley and in the first drive groove to translate rotation of the first drive pulley to the variable pitch sheave assembly. A second drive belt is seated in the groove in the second drive pulley and the second drive groove to translate rotation of the second drive pulley to the variable pitch sheave assembly. A first fan belt is seated in the first fan groove and the groove in the first fan pulley to transfer rotation of the variable pitch sheave assembly to the first fan pulley. A second fan belt is seated in the second fan groove and the groove in the second fan pulley to translate rotation of the variable pitch sheave assembly to the second fan pulley.

The first and second drive grooves have a first depth with the variable pitch sheave assembly in the high speed position and a second depth with the variable speed pitch assembly in the low speed position. The first depth of the first and second drive grooves is greater than the second depth of the first and second drive fan grooves. The first and second fan grooves also have a first depth with the variable pitch sheave assembly in the high speed position and a second depth with the variable pitch sheave assembly in the low speed position. The first depth of the first and second fan grooves is less than the second depth of the first and second fan grooves.

An actuator is operatively connected to the variable pitch sheave assembly for moving the variable pitch sheave assembly between the high speed position and a low speed position. A controller is operatively connected to the actuator. The controller monitors the temperature of the radiator and controls operation of the actuator in response to the temperature monitored.

In accordance with a further aspect of the present invention, a method is provided of cooling the engine coolant flowing through a radiator. The method includes the step of monitoring a temperature of coolant flowing through the radiator. A fan is positioned adjacent to the radiator and rotates at a predetermined speed. The speed of the fan is varied in response to the temperature of the coolant.

The method includes the additional steps of supporting the fan on a rotatable fan shaft and a driven pulley attached thereto. The driven fan pulley includes a groove formed therein. A drive pulley is also provided. The drive pulley has a groove formed therein which has a predetermined depth. A fan belt is positioned about the groove of the driven fan pulley and the groove of the drive pulley such that rotation of the drive pulley is translated to the fan pulley by the fan belt. The step of varying the speed of the fan includes the additional step of varying the depth of the groove in the drive pulley. The depth of the groove in the drive pulley is decreased to increase the speed of the fan and the depth of the groove in the drive pulley is increased to decrease the speed of the fan.

In accordance with a still further aspect of the present invention, a fan drive arrangement is provided. The fan drive arrangement operatively connects a drive shaft to a fan mounted on a rotatable fan shaft. The fan drive arrangement includes first and second fan pulleys interconnected to the fan shaft. Each fan pulley has a groove therein for receiving a corresponding fan belt. First and second drive pulleys are interconnected to the drive shaft. Each drive pulley has a groove therein for receiving a corresponding drive belt. A variable pitch sheave assembly is movable between a first high speed position and a second low speed position. The variable pitch sheave assembly includes first and second drive belt grooves and first and second fan belt grooves. The drive belt grooves have a first depth with variable pitch assembly in the high speed position and a second depth with the variable pitch assembly in the low speed position. The fan belt grooves have a first depth with variable pitch assembly in the high speed position and the second depth with the variable pitch sheave assembly in the low speed position. First and second drive belts are seated in corresponding drive belt grooves in the variable pitch sheave assembly and in corresponding grooves in the drive pulleys to translate rotation of the drive pulleys to the variable pitch sheave assembly. First and second fan belts are seated in corresponding fan belt grooves in the variable pitch sheave assembly and in corresponding grooves in the fan pulleys to translate rotation of the variable pitch sheave assembly to the fan pulleys.

The variable pitch sheave assembly of the fan drive arrangement includes a rotatable sheave shaft having first and second opposite ends. A first outer member is affixed to the first end of the sheave shaft and a second outer member is fixed to the second end of the sheave shaft. An intermediate member is fixed to the sheave shaft between the first and second ends thereof. A first slidable member is slidable along the sheave shaft between the first outer member and the intermediate member. The first slidable member and the first outer member define the first drive belt groove therebetween. The first slidable member and the intermediate member define the first fan belt groove therebetween. A second slidable member is slidable along the sheave shaft between the intermediate member and the second outer member. The second slidable member and the second outer member define the second drive groove therebetween. The second slidable member and the intermediate member define a second fan belt groove therebetween.

The first depth of a drive belt grooves is greater than the second depth of the drive belt grooves. On the other hand, the first depth of the fan belt grooves is less than the second depth of the fan belt grooves. An actuator is operatively connected to the variable pitch sheave assembly for moving the variable pitch sheave assembly between the high speed position and the low speed position. A controller is operatively connected to the actuator and monitors the temperature of the radiator. The controller controls operation of the actuator in response to the temperature of the radiator.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 3 is a cross-sectional view taken along line 3—3 of FIG. 2;

FIG. 4 is a schematic view showing rotation of the drive shafts of each generator set of the generator structure of FIG. 1;

DETAILED DESCRIPTION OF THE INVENTION

Figure 1:
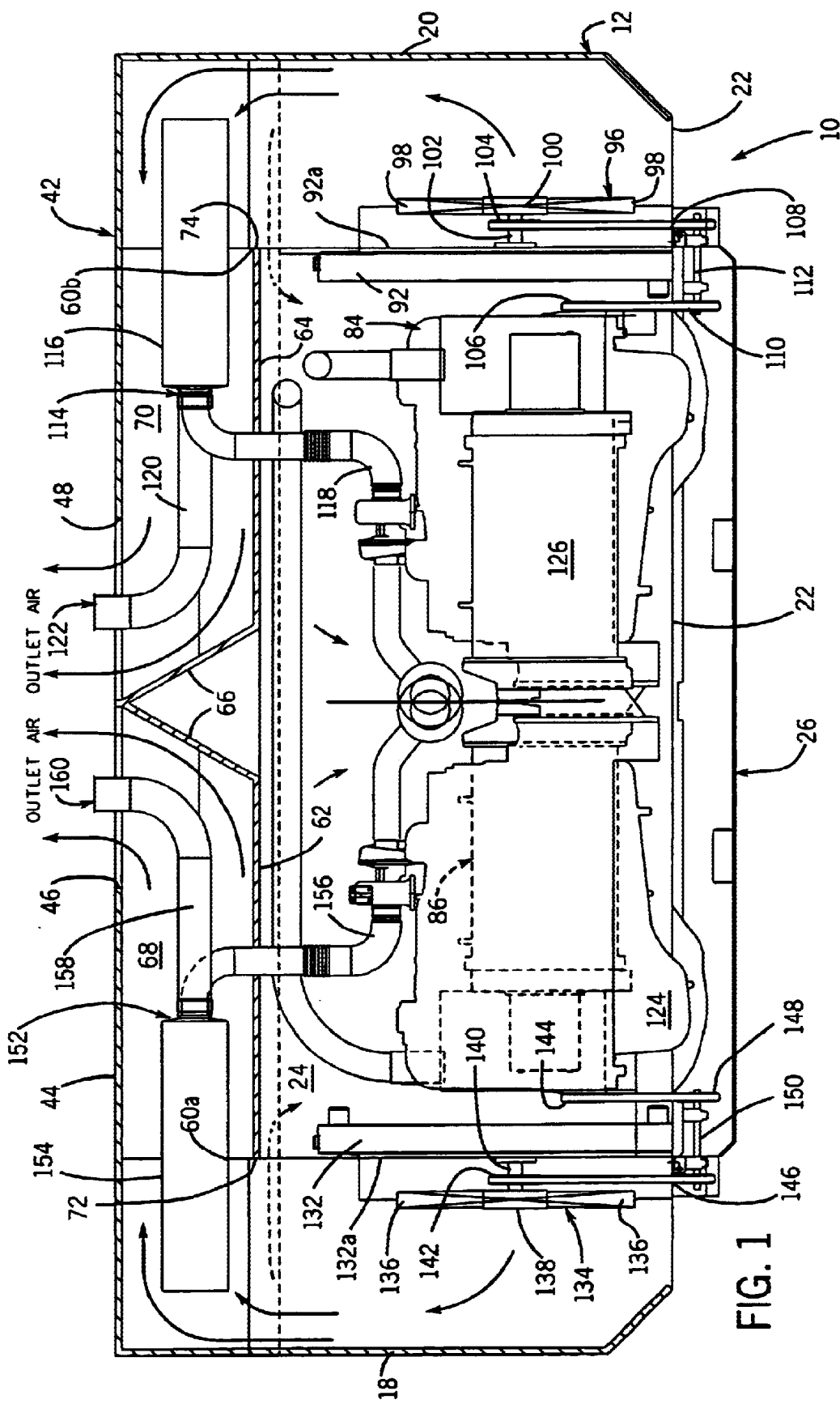
FIG. 1 is a side elevational view, with portions broken away, showing a generator structure of the present invention.
Figure 2:
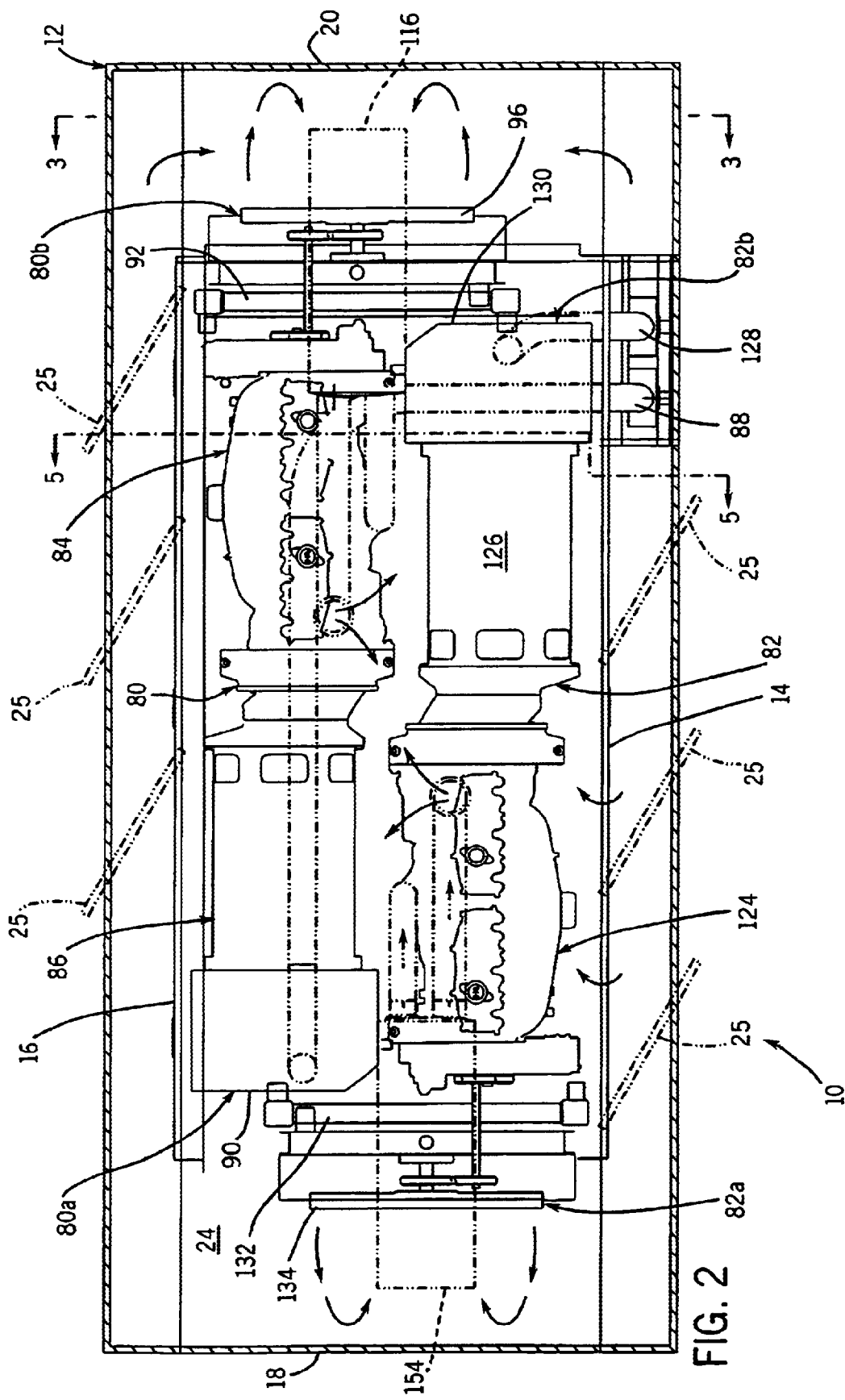
FIG. 2 is a top plan view, with portions broken away, showing the generator structure of FIG. 1.
Figure 5:
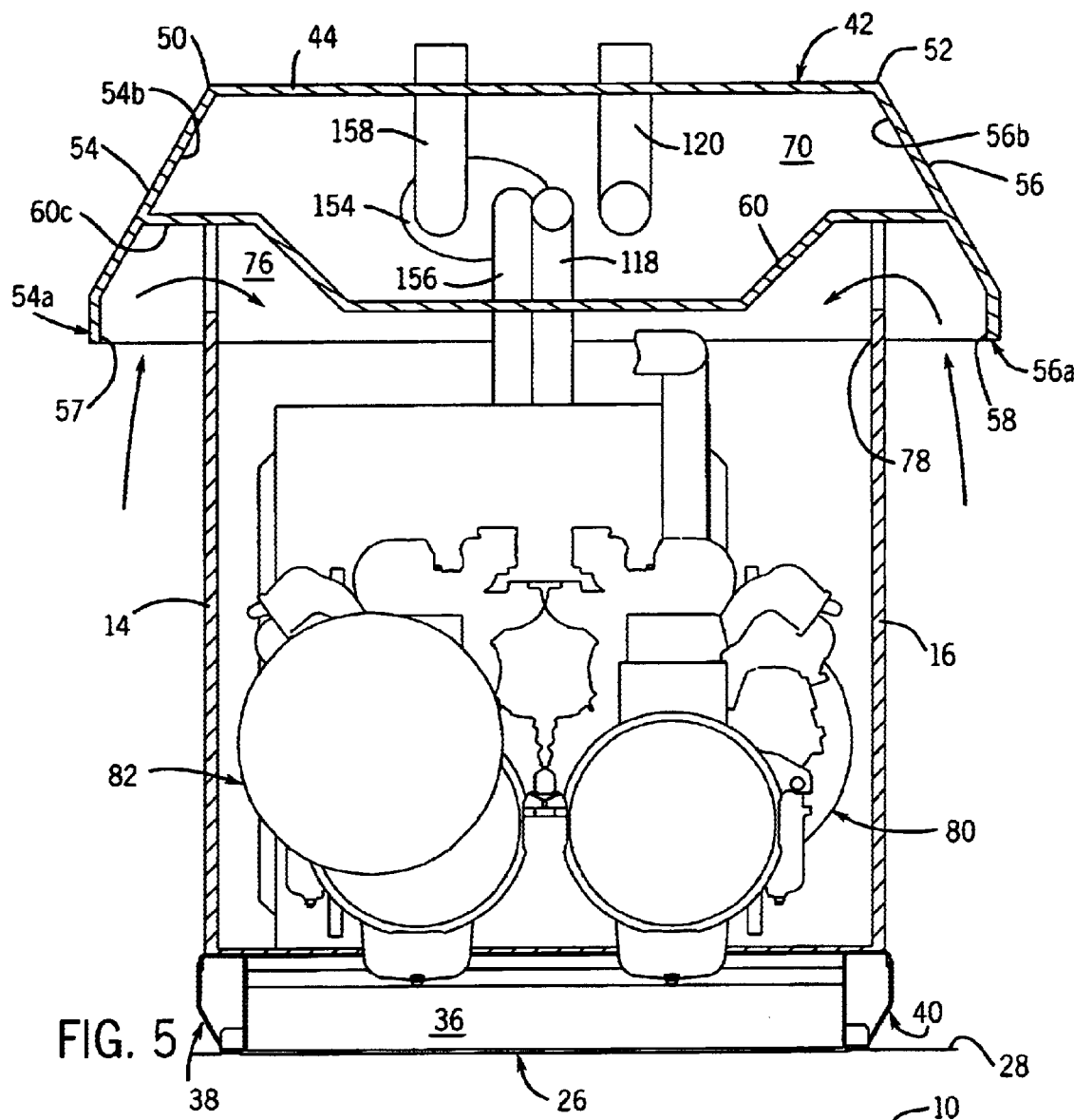
FIG. 5 is a cross-sectional view taken along line 5—5 of FIG. 2.

Referring to FIGS. 1 and 2, a generator structure in accordance with the present invention is generally designated by the reference numeral 10. Generator structure 10 includes an enclosure 12 having first and second sidewalls 14 and 16, respectively, interconnected by first and second end walls 18 and 20, respectively, and a lower bottom support 22. Sidewalls 14 and 16 and end walls 18 and 20 define interior 24 of enclosure 12 therebetween. Sidewalls 14 and 16 may include one or more doors 25 therein for allowing a user access to interior 24 of enclosure 12.

Referring to FIGS. 1 and 3, base 26 is mounted to the underside 22a of support 22 of enclosure 12 for supporting generator structure 10 above a supporting surface 28 such as the ground, a concrete slab or a mounting pad. Base 26 is generally rectangular in shape and defined by vertical sidewalls 30 and 32 interconnected by a bottom wall 34. Inner surfaces 30a and 32a of sidewalls 30 and 32, respectively, and inner surface 34a of bottom wall 34 define cavity 36 in base 26. It is contemplated to provide supports 38 and 40 adjacent outer surfaces 30b and 32b of sidewalls 30 and 32, respectively, to stabilize base 26.

Generator structure 10 further includes a roof structure, generally designated by the reference numeral 42. Roof structure 42 includes an upper panel 44 having first and second openings 46 and 48, respectively, extending therethrough. Upper panel 44 has first and second sides 50 and 52, respectively, which are generally parallel to sidewalls 14 and 16 of enclosure 12. First and second side panels 54 and 56, respectively, extend from corresponding sides 50 and 52, respectively, of upper panel 44 and diverge from each other. Side panel 54 terminates at a terminal edge 54a which is laterally spaced from sidewall 14 of enclosure 12 so as to define a first inlet 57 therebetween. Similarly, side panel 56 terminates at a terminal edge 56a which is spaced from sidewall 16 of enclosure 12 so as to define a second inlet 58 therebetween.

Separation panel 60 extends between inner surface 54b of first side panel 54 of roof structure 42 and inner surface 56b of second side panel 56 of roof structure 42. Separation panel 60 includes first and second portions 62 and 64, respectively, interconnected by a central portion 66. Central portion 66 intersects upper panel 44 such that first portion 62 of separation panel 60 and upper panel 44 define a first attic chamber 68 therebetween in roof structure 42 and second portion 64 of separation plate 60 and upper panel 44 define a second attic chamber 70 therebetween in roof structure 42. It can be appreciated that first attic chamber 68 in roof structure 42 may communicate with the ambient air outside of generator structure 10 through opening 46 in upper panel 44. In addition, second attic chamber 70 in roof structure 42 may communicate with the ambient air outside of generator structure 10 through second opening 48 in upper panel 44.

Figure 7:
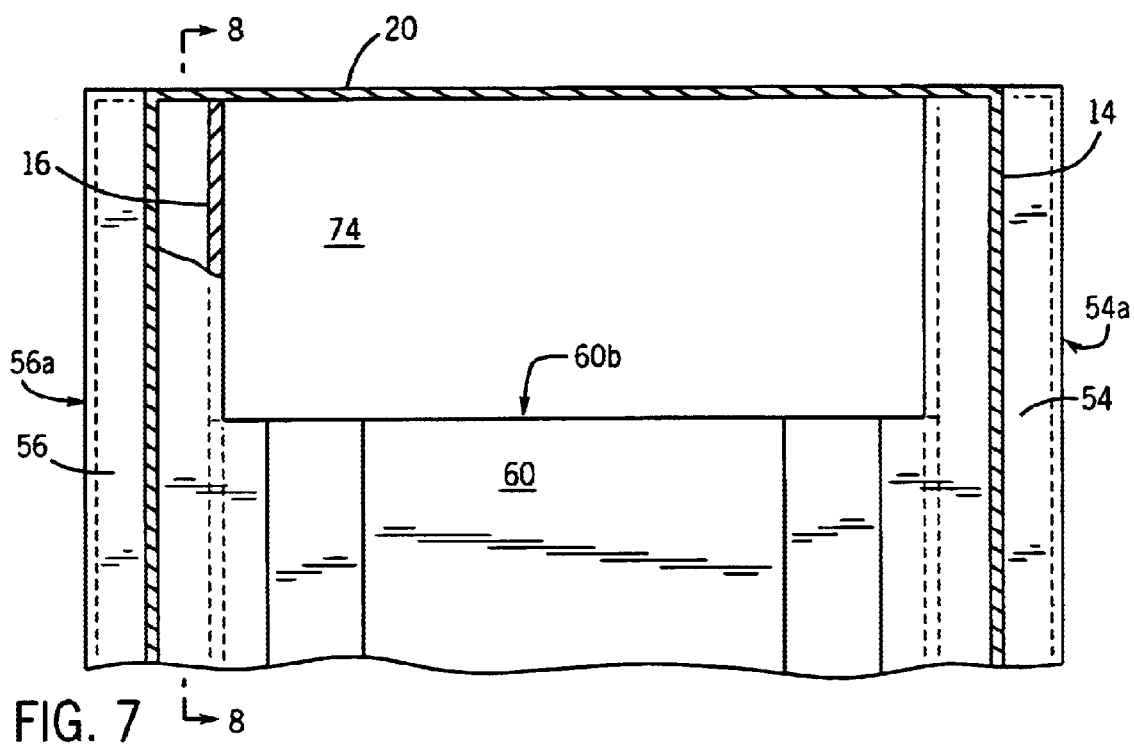
FIG. 7 is an enlarged, cross-sectional view taken along line 7—7 of FIG. 3.
Figure 8:
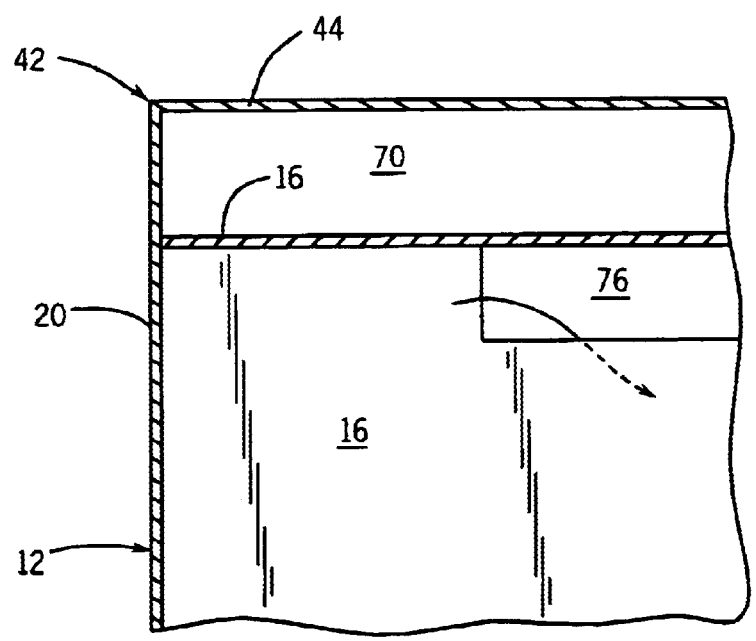
FIG. 8 is a cross-sectional view taken along line 8—8 of FIG. 7.

Separation panel 60 includes first end 60a spaced from end wall 18 of enclosure 12 so as to define first attic chamber inlet 72 between sidewalls 14 and 16. First attic chamber inlet 72 allows for first attic chamber portion 68 in roof structure 42 to communicate with interior 24 of enclosure 12 therethrough. Second end 60b of separation panel 60 is spaced from end wall 20 of enclosure 12 so as to define second attic chamber inlet 74 between sidewalls 14 and 16, FIGS. 7–8. Second attic air inlet 74 allows for second attic chamber 70 in roof structure 42 to communicate with interior 24 of enclosure 12 therethrough.

Lower surface 60c of separation panel 60 and the inner surfaces 54b and 56b of side panels 54 and 56, respectively, of roof structure 42 define an eave chamber 76 in roof structure 42. An outlet 78 to eave chamber 76 of roof structure 42 is provided between sidewalls 14 and 16 of enclosure 12. It can be appreciated that interior 24 of enclosure 12 may communicate with ambient air outside of generator structure 10 through eave chamber 76 in roof structure 42 and through first and second inlets 57 and 58, respectively.

As best seen in FIG. 2, generator structure 10 includes first and second generator sets 80 and 82, respectively, positioned next to one another within interior 24 of enclosure 12. Generator set 80 includes an alternator end 80a adjacent first end wall 18 of enclosure 12 and a fan end 80b adjacent second end wall 20 of enclosure 12. Generator set 82 includes a fan end 82a adjacent first end wall 18 of enclosure 12 and an alternator end 82b adjacent second end wall 20 of enclosure 12.

Generator set 80 includes an engine, generally designated by the reference numeral 84, which is supported on bottom support 22 of enclosure 12. As is conventional, engine 84 receives fuel such as diesel, natural gas or liquid propane vapor through an intake. The fuel is compressed and ignited within the cylinders of engine 84 so as to generate reciprocating motion of the pistons of engine 84. This reciprocating motion of the pistons of the engine 84 is converted to rotary motion such that engine 84 rotates a drive or crankshaft 85, FIG. 4. Crankshaft 85 of engine 84 is coupled to alternator 86 such that as crankshaft 85 is rotated by the operation of engine 84, crankshaft 85 drives alternator 86 which, in turn, converts the mechanical energy generated by engine 84 to electrical power for transmission and distribution. Conduit 88 has a first end operatively connected to alternator 86 within connection box 90 and a second, opposite end. Conduit 88 carries the electrical power generated by first generator set 80 to bus 89.

First generator set 80 further includes radiator 92 operatively connected to engine 84 such that engine coolant from engine 84 circulates through radiator 92 during operation of engine 84. As is conventional, radiator 92 includes a plurality of radiator tubes (not shown) through which the engine coolant flows. As hereinafter described, it is intended that air within interior 24 of enclosure 12 pass over the plurality of radiator tubes of radiator 92 so as to effectuate a heat exchange between the engine coolant flowing through the plurality of radiator tubes of radiator 92 and the air within enclosure 12.

In order to draw air over the plurality of radiator tubes of radiator 92, generator set 80 includes a fan, generally designated by the reference numeral 96. Fan 96 includes a plurality of fan blades 98 extending radially from central hub 100. Central hub 100 is rotatably supported on a first side 92a of radiator 92 by rotatable fan shaft 102. Fan shaft 102 includes a driven wheel 104 extending radially therefrom. Driven wheel 104 is operatively connected to drive wheel 106 through fan belts 108 and 110 and jack shaft 112. Drive wheel 106 is operatively connected to crankshaft 85 of engine 84 such that drive wheel 106 is rotated by a crankshaft 85 during operation of engine 84. Rotation of drive wheel 106 is translated to driven wheel 104 through belts 108 and 110 and jack shaft 112 which, in turn, rotates fan 96. Rotation of fan 96 draws air through first and second inlets 57 and 58, respectively, in roof structure 42; across engine 84 of first generator set 80; and across the plurality of radiator tubes of radiator 92 so as to cool engine 84 and the engine coolant flowing through the plurality of radiator tubes of radiator 92. In addition, fan 96 urges the air drawn across the plurality of radiator tubes of radiator 92 from the interior 24 of enclosure 12 into second attic chamber 70 in roof structure 42 through second attic chamber inlet 74; and out from roof structure 42 through second opening 48 in upper panel 44.

The exhaust outlet of engine 84 of first generator set 80 is interconnected to input 114 of muffler 116 through an exhaust pipe 118. Muffler 116 is positioned within second attic chamber 70 in roof structure 42 such that the air urged by fan 96 from generator structure 10 passes over muffler 116 to cool the same. Output of muffler 116 is operatively connected to the input of exhaust discharge tube 120. Exhaust discharge tube 120 includes outlet end 122 which extends through opening 48 in upper panel 44 of roof structure 42 and which communicates with the ambient air outside generator structure 10.

Second generator set 82 includes an engine, generally designated by the reference numeral 124, which is supported on bottom support 22 of enclosure 12. As is conventional, engine 124 receives fuel such as diesel, natural gas or liquid propane vapor through an intake. It is contemplated that engines 84 and 124 receive fuel from a common source. The fuel is compressed and ignited within the cylinders of engine 124 so as to generate reciprocating motion of the pistons of engine 124. This reciprocating motion of the pistons of engine 124 is converted to rotary motion such that engine 124 rotates a drive or crankshaft 125. Crankshaft 125 of engine 124 is coupled to an alternator 126 such that as crankshaft 125 is rotated by operation of engine 124, crankshaft 125 drives alternator 126 which, in turn, converts the mechanical energy generated by engine 124 to electrical power for transmission and distribution. Conduit 128 has a first end operatively connected to alternator 126 within connection box 130 and a second opposite end. Conduit 128 carries the electrical power generated by second generator set 82 to a bus 89, FIG. 6.

Second generator set further includes radiator 132 operatively connected to engine 124 such that coolant from engine 124 circulates through radiator 132 during operation of engine 124. As is conventional, radiator 132 includes a plurality of radiator tubes (not shown) through which the engine coolant flows. As hereinafter described, it is intended that air within interior 24 of enclosure 12 pass over a plurality of radiator tubes of radiator 132 so as to effectuate a heat exchange between the engine coolant flowing through the plurality of radiator tubes of radiator 132 and the air within enclosure 12.

In order to draw air over the plurality of radiator tubes of radiator 132, generator set 82 includes a fan, generally designated by the reference numeral 134. Fan 134 includes a plurality of fan blades 136 extending radially from central hub 138. Central hub 138 is rotatably supported on a first side 132a of radiator 132 by rotatable fan shaft 140. Fan shaft 140 includes a driven wheel 142 extending radially therefrom. Driven wheel 142 is operatively connected to drive wheel 144 through fan belts 146 and 148 and jack shaft 150. Drive wheel 144 is operatively connected to crankshaft 125 of engine 124 such that drive wheel 144 is rotated by a crankshaft 125 during operation of engine 124. Rotation of drive wheel 144 is translated to driven wheel 142 through belts 146 and 148 and jack shaft 150 which, in turn, rotates fan 134. Rotation of fan 134 draws air through first and second inlets 57 and 58, respectively, in roof structure 42; across engine 124 of second generator set 82; and through radiator 132 across the plurality of radiator tubes thereof so as to cool engine 124 and the engine coolant flowing through the plurality of radiator tubes of radiator 132. In addition, fan 134 urges the air drawn across the plurality of radiator tubes of radiator 132 from the interior 24 of enclosure 12 into first attic chamber 68 in roof structure 42 through first attic chamber inlet 72; and out from roof structure 42 through first opening 46 in upper panel 44.

The exhaust outlet of engine 124 of second generator set 82 is interconnected to input 152 of muffler 154 through an exhaust pipe 156. Muffler 154 is positioned within first attic chamber 68 in roof structure 42 such that the air urged by fan 134 from generator structure 10 passes over muffler 154 to cool the same. Output of muffler 154 is operatively connected to the input of exhaust discharge tube 158. Exhaust discharge tube 158 includes outlet end 160 which extends through opening 46 in upper panel 44 of roof structure 42 and which communicates with the ambient air outside generator structure 10.

Figure 6:
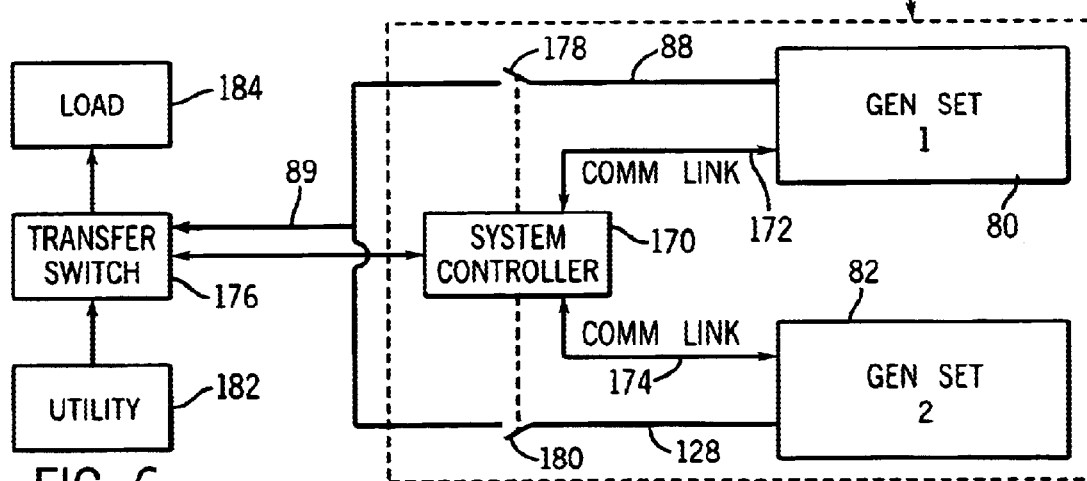
FIG. 6 is a schematic view showing connection of the generator structure of FIG. 1.

Referring to FIG. 6, generator structure 10 includes system controller 170 that is operatively connected to first and second generator sets 80 and 82, respectively, through communication links 172 and 174, respectively. In addition, system controller 170 is operatively connected to transfer switch 176, for reasons hereinafter described, and to switches 178 and 180 in conduits 88 and 128, respectively.

Transfer switch 176 includes a first input operatively connected to utility source 182 and a second input electrically connected to generator structure 10 through bus 89.

The output of transfer switch 176 is operatively connected to load 184. As is conventional, transfer switch 176 incorporates a switch which isolates the electrical power supplied by utility source 182 and the electrical power supplied by generator structure 10 on bus 89. A monitoring circuit is operatively connected to utility source 182 to monitor the electrical power supplied by utility source 182. In response to a power outage from utility source 182, the monitoring circuit of transfer switch 176 advises system controller 170 accordingly.

System controller 170 starts first and second generator sets 80 and 82, respectively, in a conventional manner and monitors the magnitude and phase of the electrical power generated thereby on conduits 88 and 128, respectively. Thereafter, system controller 170 adjusts the engine speed of engines 84 and 124 of first and second generator sets 80 and 82, respectively, via an electronic governor or the like such that the AC power generated by first and second generators 80 and 82, respectively, is brought into alignment (synchronized) with each other such that there is no phase difference between the sine waves and that the sine waves are at the same frequency. In addition, system controller 170 regulates the output voltages of generator sets 80 and 82 in a conventional manner such that output voltages of generators sets 80 and 82 are generally equal. System controller 170 closes switches 178 and 180 in conduits 188 and 128, respectively, such that the combined AC power generated by first and second generator sets 80 and 82, respectively, is provided on bus 89. Transfer switch 176 automatically transfers load from utility source 182 to generator structure 10 such that generator structure 10 provides AC power to load 184. Upon completion of the power outage, the transfer switch automatically reconnects load 184 to the utility source 182. In addition, the monitoring circuit of transfer switch 176 advises system controller 170 of generator structure 10 accordingly such that system controller 170 terminates operation of first and second generator sets 80 and 82, respectively.

As heretofore described, during operation of first and second generator sets 80 and 82, respectively, engines 84 and 124 drive corresponding fans 96 and 134, respectively. Rotation of fan 96 draws air through first and second inlets 57 and 58, respectively, in roof structure 42; across engine 84 of first generator set 80; and across the plurality of radiator tubes of radiator 92 so as to cool engine 84 and the coolant flowing through the plurality radiator of radiator 92. Further, rotation of fan 96 urges the air drawn across the plurality of radiator tubes of radiator 92 from the interior of enclosure 12 into second attic chamber 70 in roof structure 42 through second attic chamber inlet 74. The air in second attic chamber 70 passes over muffler 116 positioned therein so as to cool the same. Thereafter, the air exits roof structure 42 through second opening 48 in upper panel 44.

Similarly, rotation of fan 134 draws air through first and second inlets 57 and 58, respectively, in roof structure 42; across engine 124 of second generator set 82; and across the plurality of radiator tubes of radiator 132 so as to cool engine 124 and the engine coolant flowing through the plurality of radiator tubes of radiator 132. In addition, fan 134 urges the air drawn across the plurality of radiator tubes of radiator 132 from the interior 124 of enclosure 12 in first attic chamber 68 in roof structure 42 through first attic chamber inlet 72. The air in first attic chamber 68 passes over muffler 154 positioned therein so as to cool the same. Thereafter, the air exits roof structure 42 through first opening 46 in upper panel 44.

Figure 9:
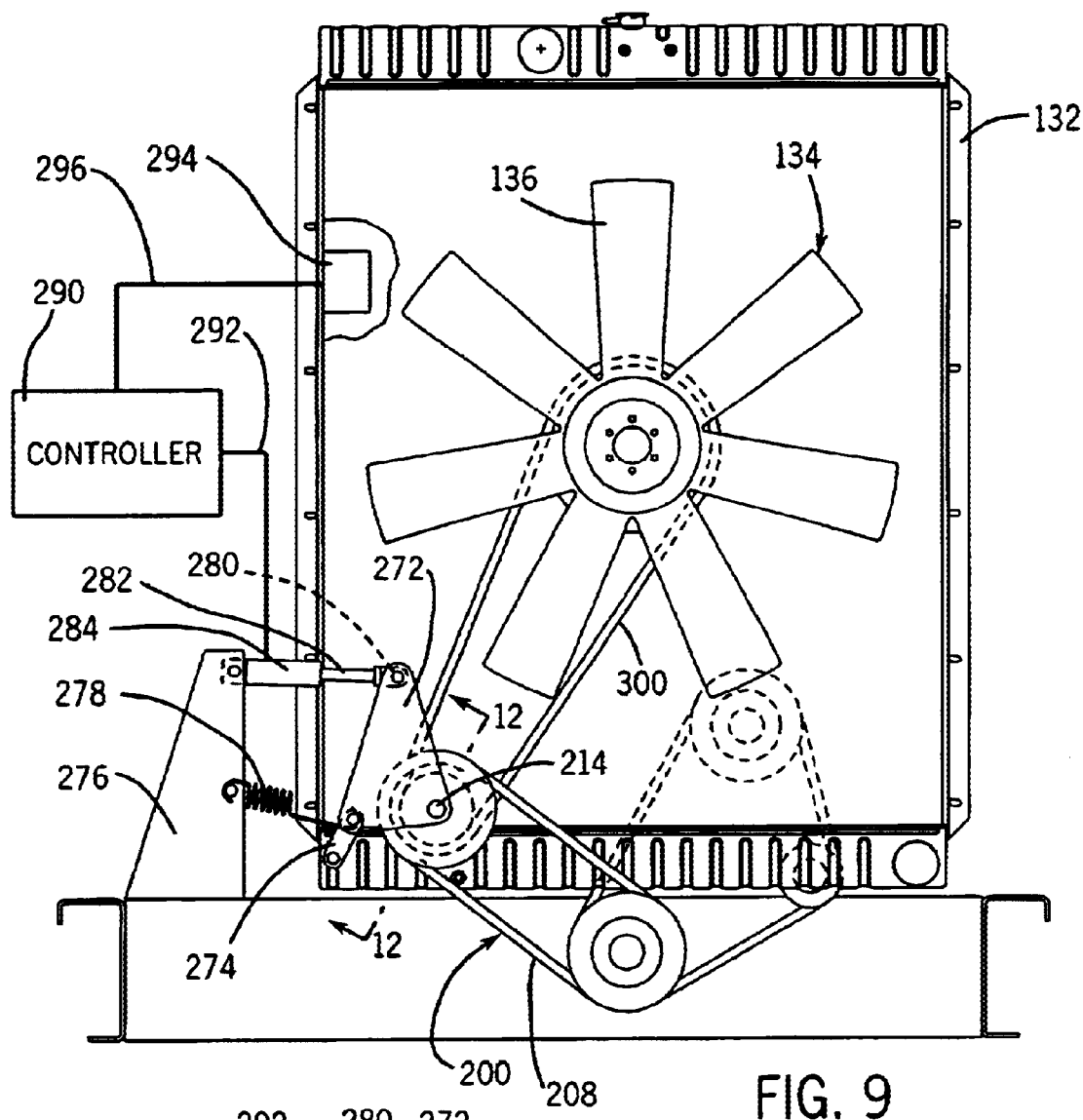
FIG. 9 is an end view of a fan drive arrangement for the generator structure of the present invention.

Referring to FIG. 9, an alternate fan drive arrangement is generally designated by the reference numeral 200. As hereinafter described, fan drive arrangement 200 is used to drive fan 134. However, it can be appreciated that a second fan drive arrangement (not shown), identical in structure to fan drive arrangement 200, may be used to drive fan 96 without deviating from the scope of the present invention.

Figure 10:
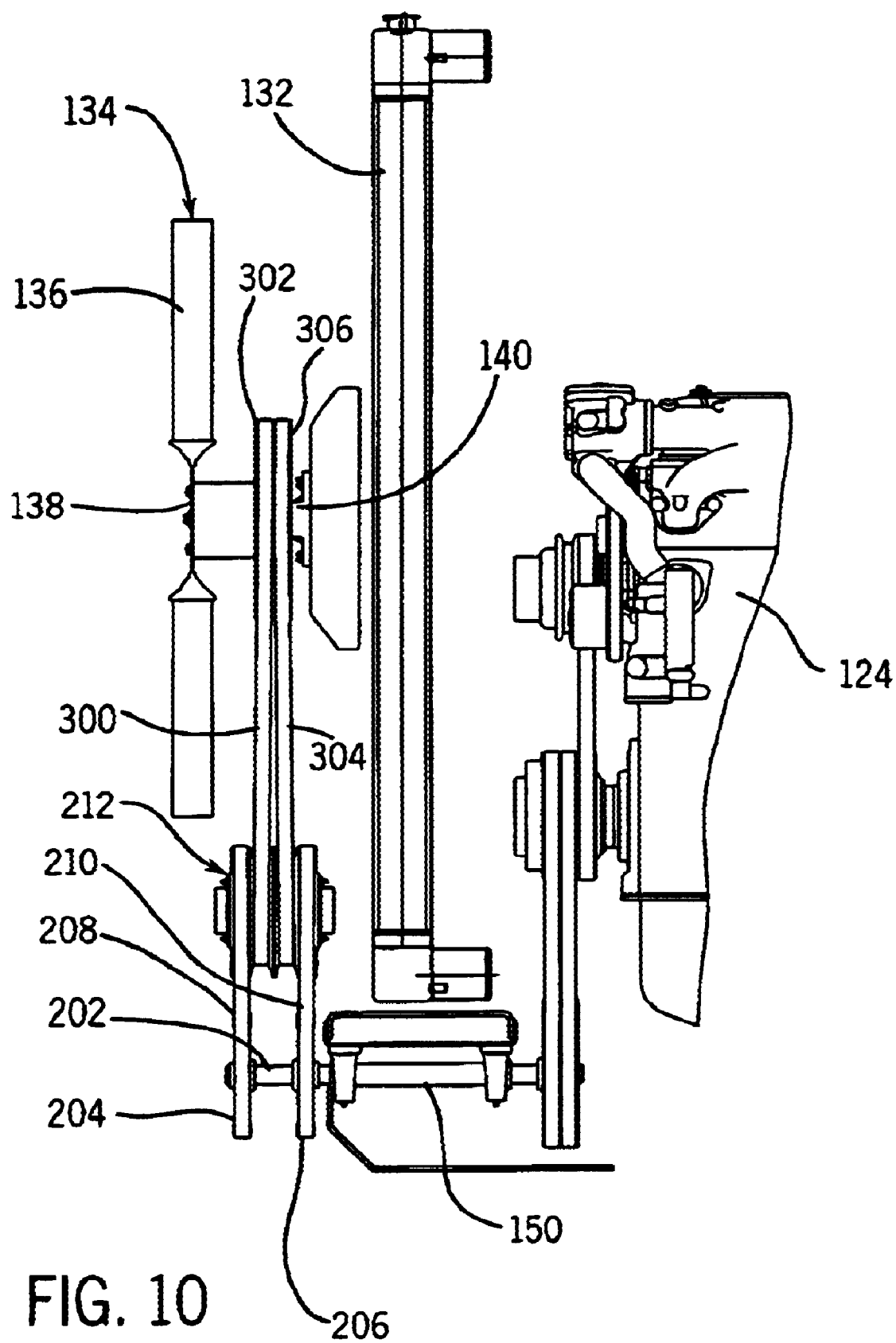
FIG. 10 is a side elevational view of the fan drive arrangement of FIG. 9.

As best seen in FIG. 10, jack shaft 150 is operatively connected to drive shaft 202 for rotational movement therewith. Drive pulleys 204 and 206 project radially from drive shaft 202 and include corresponding grooves therein for accommodating drive belts 208 and 210, respectively, therein. Drive belts 208 and 210 translate rotation of drive pulleys 204 and 206, respectively, to variable pitch sheave assembly 212, as hereinafter described.

Figure 12:
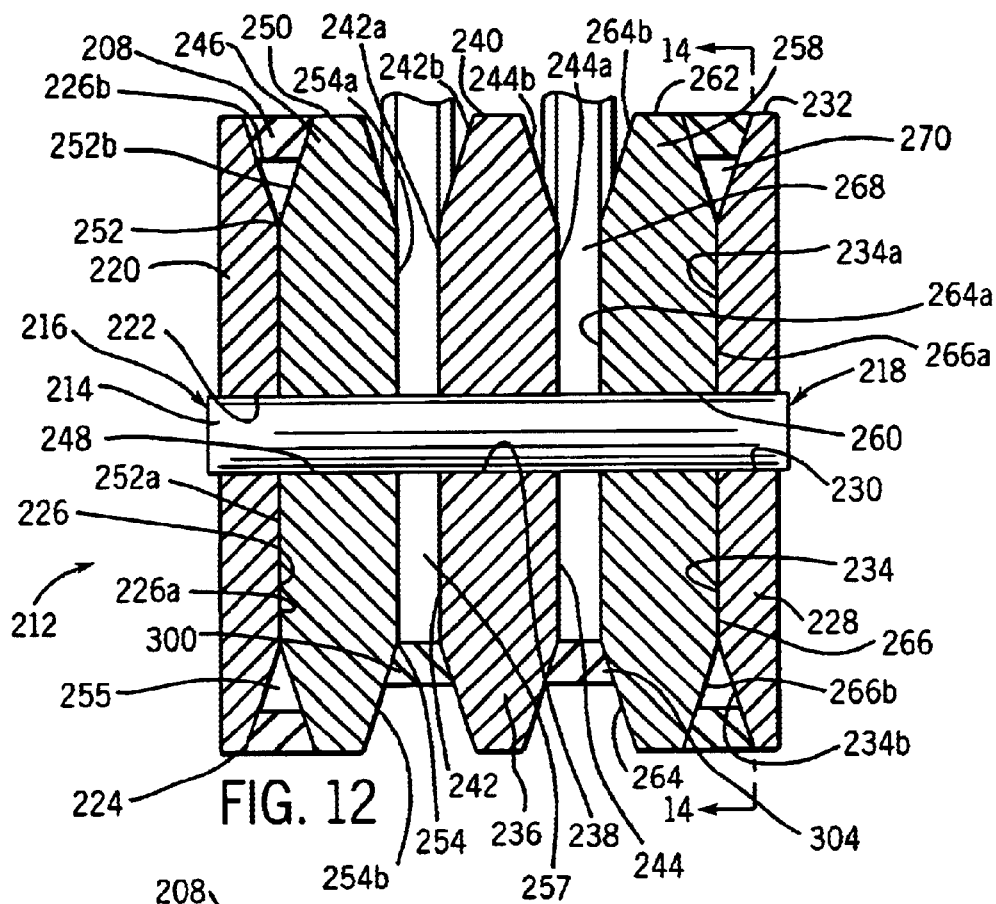
FIG. 12 is a cross-sectional view taken along line 12—12 of FIG. 9.
Figure 13:
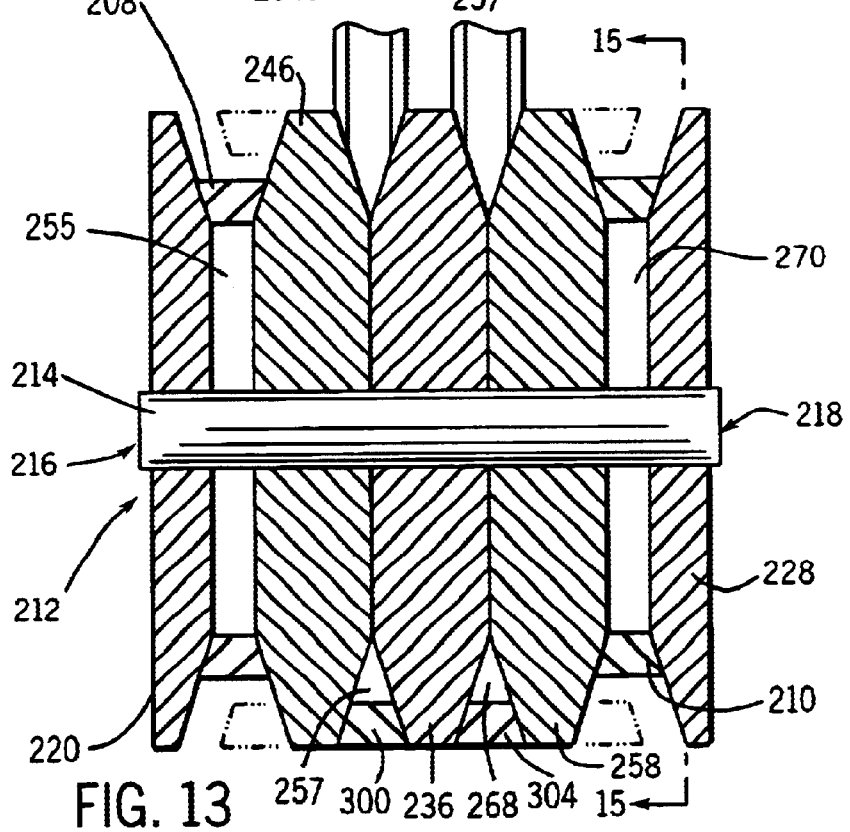
FIG. 13 is a cross-sectional view taken along line 13—13 of FIG. 11.
Figure 14:
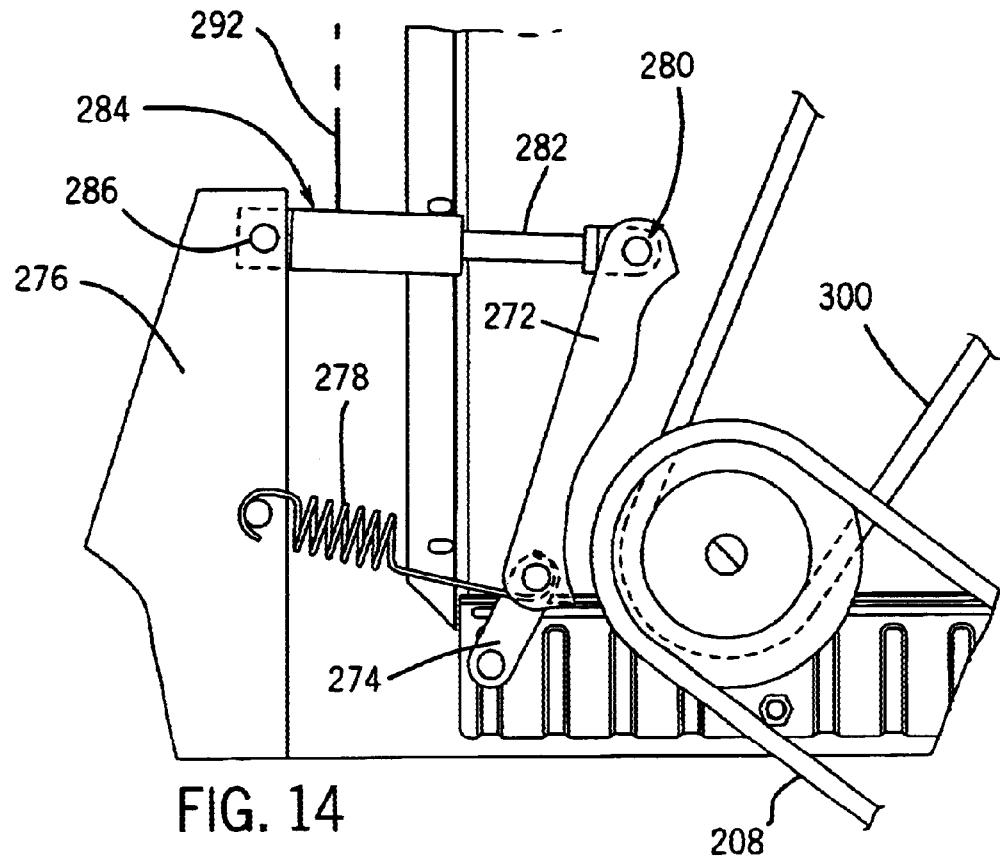
FIG. 14 is a cross-sectional view taken along line 14—14 of FIG. 12.
Figure 15:
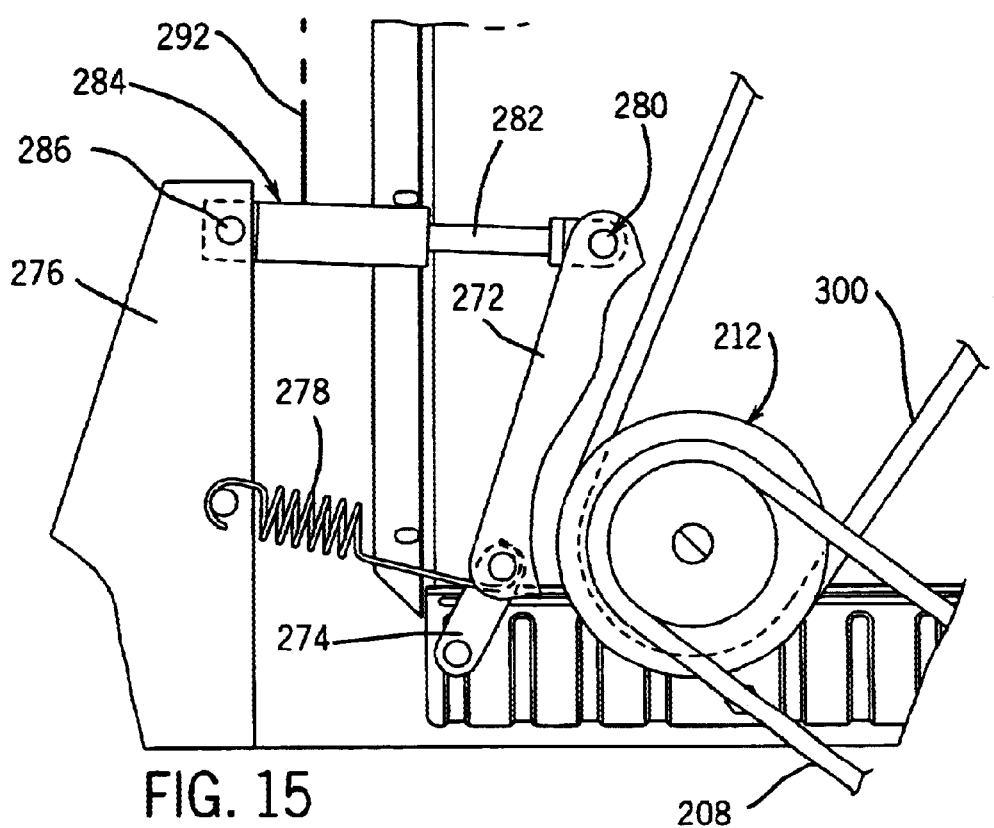
FIG. 15 is a cross-sectional view taken along line 15—15 of FIG. 13.

Referring to FIGS. 12–13, variable pitch sheave assembly 212 includes a rotatable sheave shaft 214 extending along a longitudinal axis and having first and second opposite ends 216 and 218, respectively. First outer sheave member 220 projects radially from and is fixed to sheave shaft 214 adjacent first end 216 thereof for rotational movement with sheave shaft 214. First outer sheave member 220 includes radially inner edge 222 engaging sheave shaft 214 and radially outer edge 224. Inner edge 222 and outer edge 224 of first outer sheave member 220 are interconnected by an inwardly directed surface 226 having a disc-shaped, radially inner portion 226a and a conical-shaped, radially outer portion 226b.

Second outer sheave member 228 projects radially from and is fixed to sheave shaft 214 adjacent second end 218 thereof for rotational movement with sheave shaft 214. Second outer sheave member 228 includes radially inner edge 230 engaging sheave shaft 214 and radially outer edge 232. Inner edge 230 and outer edge 232 of second outer sheave member 228 are interconnected by an inwardly directed surface 234 having a disc-shaped, radially inner portion 234a and a conical shaped, radially outer portion 234b.

Intermediate sheave member 236, projects radially from and is fixed to sheave shaft 214 for rotational movement therewith at a location equidistant from first and second ends 216 and 218, respectively, of sheave shaft 214. Intermediate sheave member 236 includes radially inner edge 238 engaging sheave shaft 214 and radially outer edge 240. Inner edge 238 and outer edge 240 of intermediate sheave member 236 are interconnected by first and second sides 242 and 244, respectively. First surface 242 of intermediate sheave member 236 is directed towards first outer sheave member 220 and includes a disc-shaped, radially inner portion 242a and a conical-shaped outer portion 242b. Second side 244 of intermediate sheave member 236 is directed towards second outer sheave member 228 and includes a disc-shaped, radially inner portion 244a and a conical-shaped, radially outer portion 244b.

First movable sheave member 246 is slidably mounted on sheave shaft 214 and is movable between first outer sheave member 220 and intermediate sheave member 236. First movable sheave member 246 includes radially inner edge 248 which is slidable along sheave shaft 214 and radially outer edge 250. Inner edge 248 and outer edge 250 of first movable sheave member 246 are interconnected by first and second sides 252 and 254, respectively. First side 252 directed towards the first outer sheave member 220 and second side 254 of first movable sheave member 246 is directed towards intermediate sheave member 236. First side 252 of first movable sheave member 246 includes a first disc-shaped radially inner portion 252a and a conical shaped radially outer portion 252b. First side 252 of first movable sheave member 246 and inwardly directed surface 226 of first outer sheave member 220 define a first drive belt receiving groove 255, for reasons hereinafter described. Second side 254 of first movable sheave member 246 includes disc-shaped radially inner portion 254a and a conical shaped radially outer portion 254b. Second side 254 of first movable sheave member 246 and first side 242 of intermediate sheave member 236 define a first fan belt receiving groove 257 there between, for reasons hereinafter described.

Variable pitch sheave assembly 212 further includes second movable sheave member 258 slidably mounted on sheave shaft 214 between intermediate sheave member 236 and second outer sheave member 228. Second movable sheave member 258 includes radially inner edge 260 slidable along sheave shaft 214 and radially outer edge 262. Inner edge 260 and outer edge 262 of second movable sheave member 258 are interconnected by first and second sides 264 and 266, respectively. First side 264 of second movable sheave member 258 includes a disc-shaped, radially inner portion 264a and a conical shaped radially outer portion 264b. First side 264 of second movable sheave member 258 and second side 244 of intermediate sheave member 236 define a second fan belt receiving groove 268 therebetween, for reasons hereinafter described. Second side 266 of second movable sheave member 258 includes a disc-shaped, radially inner portion 266a and a conical-shaped, radially outer portion 26b. Second side 266 of second movable sheave member 258 and inwardly directed surface 234 of second outer sheave member 228 define the second drive belt receiving groove 270 therebetween. As hereinafter described, first and second movable sheave members 246 and 258, respectively, are movable between a first high speed position, FIG. 13, and a second low speed position, FIG. 12.

Sheave shaft 214 is rotatably supported by a support bracket 272 extending from opposite ends 216 and 218, thereof. As best seen in FIGS. 9, 11 and 14–15, support bracket 272 is pivotably connected to bracket element 274, which, in turn, is pivotably connected to enclosure 12 of generator structure 10 in any conventional manner. Bracket element 274 is further connected to vertical support 276 projecting from base 26 of generator structure 10 by spring 278, for reasons hereinafter described.

Support bracket 272 is also pivotably connected to terminal end 280 of shaft 282 of an actuator 284. Cylinder housing 286 of actuator 284 is pivotably connected to vertical support 276. It can be appreciated that shaft 282 of actuator 286 is movable between a first extended position, FIG. 9, wherein variable pitch sheave assembly 212 is positioned in the low speed position by support bracket 272 and a second retracted position, FIG. 11, wherein the variable pitch sheave assembly 212 is positioned in the high speed positioned by support bracket 272. Spring 278 biases bracket 274 and support bracket 272 toward vertical support 276 so as to maintain tension on drive belts 208 and 210, and on fan belts 300 and 304.

Figure 11:
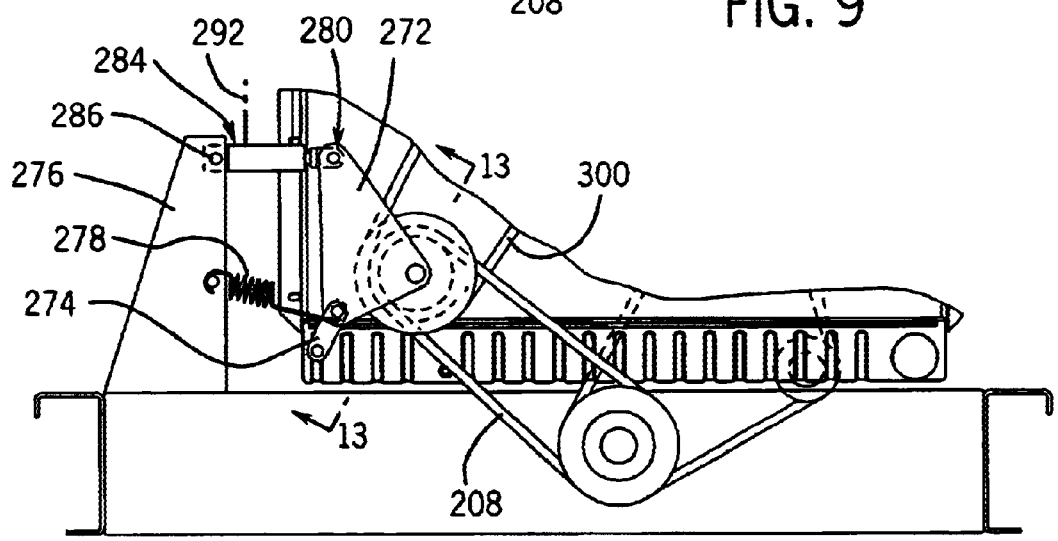
FIG. 11 is an enlarged, end view of the fan drive arrangement of FIG. 9.

Controller 290 is operatively connected to actuator 284 by line 292 to control movement of shaft 282 of actuator 284 between the extended position, FIG. 9, and the retracted position, FIG. 11. In addition, controller 90 is operatively connected by line 296 to temperature sensor 294 positioned adjacent to or within radiator 132 such that the position of shaft 282 of actuator 284 and hence, the position of variable pitch sheave assembly 212, is responsive to the temperature sensed by temperature sensor 294.

Referring to FIGS. 10 and 12–13, variable pitch sheave assembly 212 is operatively connected to drive pulleys 204 and 206 by drive belts 208 and 210, respectively. Drive belt 208 is seated within the groove in drive pulley 204 and within drive belt receiving groove 255 of variable pitch assembly 212. Drive belt 210 is seated within the groove in drive pulley 206 and within second drive belt receiving groove 270 of variable pitch sheave assembly 212. As described, rotation of drive pulleys 204 and 206 is translated to variable pitch sheave assembly 212 by drive belts 208 and 210, respectively.

First fan belt 300 is seated within first fan belt receiving groove 257 of variable pitch sheave assembly 212 and within a groove extending about first fan pulley 302 which projects radially from rotatable fan shaft 140. Second fan belt 304 is seated within second fan belt receiving groove 268 of variable pitch sheave assembly 212 and within a groove extending about second fan pulley 306 which projects radially from fan shaft 140. As described, rotation of variable pitch sheave assembly, as heretofore described, is translated to fan pulleys 302 and 306 through corresponding fan belts 300 and 304, respectively. It can be appreciated that rotation of fan pulleys 302 and 306 is translated by fan shaft 140 to fan 134 which, in turn, draws air through radiator 132, as heretofore described.

During start-up of generator structure 10, as heretofore described, controller 290 positions shaft 282 of actuator 284 in the extended position, FIG. 9. With shaft 282 of actuator 284 in the extended position, variable pitch sheave assembly 212 is in the low speed position, FIG. 12, wherein variable pitch sheave assembly 212 is closer to drive pulleys 204 and 206 and further from fan pulleys 302 and 306. As a result, fan belts 300 and 304 are drawn towards sheave shaft 214 so as to urge first and second movable sheave members 246 and 258, respectively towards corresponding outer sheave members 220 and 228, respectively, and into the low speed position, FIG. 12. As best seen in FIG. 12, the depths of fan belt receiving grooves 257 and 268 of variable pitch sheave assembly 212 are greater than the depths of drive belt receiving grooves 255 and 270 of variable pitch sheave assembly 212.

As generator structure 10 continues operation, the temperature of the engine coolant flowing through engine 124 and through radiator 132 operatively connected thereto increases. Temperature sensor 294 senses the increased temperature of the engine coolant flowing through radiator 132 and provides such information to controller 290 on line 296. As a result, controller 290 retracts shaft 282 of actuator 284 such that variable pitch sheave assembly 212 moves towards the high speed position, FIG. 13. As best seen in FIG. 11, as variable pitch sheave assembly 212 moves towards the high speed position, variable pitch sheave assembly 212 is further from drive pulleys 204 and 206 and closer to fan pulleys 302 and 306. As such, drive belts 208 and 210 urge first and second movable sheave members 246 and 258, respectively, away from corresponding outer sheave members 220 and 228, respectively, and towards intermediate sheave member 236. It can be appreciated that the depths of drive belt receiving grooves 255 and 270 in variable pitch sheave assembly 212 increase as first and second movable sheave members 246 and 258, respectively, move from the low speed position, FIG. 12, to the high speed position, FIG. 13. Further, with first and second movable sheave members 246 and 248, respectively, in the high speed position, FIG. 13, the depths of fan belt receiving grooves 257 and 268 is reduced such that the depths of the drive belt receiving grooves 255 and 270 is greater than the depths of fan belt receiving grooves 257 and 268.

It can be appreciated that in the low speed position, drive belts 208 and 210 travel along a greater circumferential path within drive belt receiving grooves 255 and 270, respectively, variable pitch drive sheave assembly 212 and fan belts 300 and 304 travel along a smaller circumferential path within fan belt receiving grooves 257 and 268 in variable pitch sheave assembly 212. Consequently, rotation of variable pitch sheave assembly 212 is translated to fan pulleys 302 and 306 such that fan 134 travels at a first predetermined speed. With variable pitch sheave assembly in the high speed position, FIG. 13, the path of drive belts 208 and 210 circumferentially within drive belt receiving grooves 255 and 270, respectively, in variable pitch sheave assembly 212 is reduced and the path of fan belts 300 and 304 circumferentially within fan belt receiving grooves 257 and 268 in variable pitch sheave assembly 212 is increased. As result, if drive pulleys 204 and 206 are rotated at a constant speed by jack shaft 150, the speed of rotation of variable pitch sheave assembly 212 will increase with the variable pitch sheave assembly 212 in the high speed position, FIG. 13. In addition, in the high speed position, FIG. 13, fan belts 300 and 304 travel a greater distance for each revolution of variable pitch sheave assembly 212. Consequently, fan pulleys 302 and 306 will travel a greater distance for each revolution of variable pitch sheave assembly 212, and as such, rotate fan 134 more quickly. As described, by repositioning variable pitch sheave assembly 212 from the low speed position, FIG. 12, to the high speed position, FIG. 13, the speed of rotation of fan 136 will increase given a constant speed of rotation of jack shaft 150. Hence, fan 134 can draw or push more air through radiator 132 so as to enhance the cooling effect thereof.

Various modes of carrying out the invention are contemplated as being within the scope of the following claims particularly pointing and distinctly claiming the subject matter which is regarded as the invention.

We claim:

1. A variable pitch drive sheave assembly for interconnecting first and second fan pulleys operatively connected to a fan by a rotatable fan shaft and first and second rotatable drive pulleys, the fan generating an air flow through a radiator to cool the temperature thereof, comprising:
   a shaft extending along an axis and having first and second opposite ends;
   a first outer sheave member positioned adjacent the first end of the shaft;
   a second outer sheave member positioned adjacent the second end of the shaft;
   an intermediate sheave member positioned between the first and second ends of the shaft;
   a first movable sheave member slidable between the first outer sheave member and the intermediate sheave member, the first movable sheave member and the first outer sheave member defining a first drive pulley groove therebetween for receiving a first drive belt and the first movable sheave member and the intermediate sheave member defining a first fan pulley groove therebetween for receiving a first fan belt;
   a second movable sheave member slidable between the second outer sheave member and the intermediate sheave member, the second movable sheave member and the second outer sheave member defining a second drive pulley groove therebetween for receiving a second drive belt and the second movable sheave member and the intermediate sheave member defining a second fan pulley groove therebetween for receiving a second fan belt;
   an actuator operatively connected to the shaft for moving the first and second movable sheave members between a first high speed position and a second low speed position;
   a monitoring device for monitoring the temperature of the radiator, the monitoring device controlling movement of the actuator in response to the temperature of the radiator; and wherein:
   the first drive belt operatively connects the first drive pulley groove and the first drive pulley; the second drive belt operatively connects the second drive pulley groove and the second drive pulley; the first fan belt operatively connects the first fan pulley groove and the first fan pulley; and the second fan belt operatively connects the second fan pulley groove and the second fan pulley such that rotation of the first and second drive pulleys is translated to the first and second fan pulleys.

2. The drive sheave assembly of claim 1 wherein the first and second drive pulley grooves have a first depth with the first and second movable sheave members in the high speed position and a second depth with the first and second movable sheave members in the low speed position.

3. The drive sheave assembly of claim 2 where the first depth of the first and second drive pulley grooves is greater than the second depth of the first and second drive pulley grooves.

4. The drive sheave assembly of claim 1 wherein the first and second fan pulley grooves have a first depth with the first and second movable sheave members in the high speed position and a second depth with the first and second movable sheave members in the low speed position.

5. The drive sheave assembly of claim 4 where the first depth of the first and second fan pulley grooves is less than the second depth of the first and second fan pulley grooves.

6. A fan drive arrangement for operatively connecting a drive shaft to a fan mounted on a rotatable fan shaft, the fan generating an air flow through a radiator to cool the temperature thereof, comprising:
   first and second fan pulleys interconnected to the fan shaft, each fan pulley having a groove therein for receiving a corresponding fan belt;
   first and second drive pulleys interconnected to the drive shaft, each drive pulley having a groove therein for receiving a corresponding drive belt;
   a variable pitch sheave assembly movable between a first high speed position and a second low speed position, the variable pitch sheave including:
      a rotatable sheave shaft having first and second opposite ends;
      a first outer member fixed to the first end of the sheave shaft;
      a second outer member fixed to the second end of the sheave shaft;
      an intermediate member fixed to the sheave shaft between the first and the second ends thereof;
      a first slidable member slidable along the sheave shaft between the first outer member and the intermediate member; the first slidable member and the first outer member defining a first drive groove therebetween and the first slidable member and the intermediate member defining a first fan groove therebetween;
      a second slidable member slidable along the sheave shaft between the intermediate member and the second outer member; the second slidable member and the second outer member defining a second drive groove therebetween and the second slidable member and the intermediate member defining a second fan groove therebetween;
   a first drive belt seated in the groove in the first drive pulley and the first drive groove to translate rotation of the first drive pulley to the variable pitch sheave assembly;

a second drive belt seated in the groove in the second drive pulley and the second drive groove to translate rotation of the second drive pulley to the variable pitch sheave assembly;

a first fan belt seated in the first fan groove and the groove in the first fan pulley to translate rotation of the variable pitch sheave assembly to the first fan pulley;

a second fan belt seated in the second fan groove and the groove in the second fan pulley to translate rotation of the variable pitch sheave assembly to the second fan pulley;

an actuator operatively connected to the variable pitch sheave assembly for moving the variable pitch sheave assembly between the high speed position and the low speed position; and a controller operatively connected to the actuator and monitoring the temperature of the radiator, the controller controlling operation of the actuator in response to the temperature of the radiator.

7. The fan drive arrangement of claim 6 wherein the first and second drive grooves have a first depth with the variable pitch sheave assembly in the high speed position and a second depth with the variable pitch sheave assembly in the low speed position.

8. The fan drive arrangement of claim 7 wherein the first depth of the first and second drive grooves is greater than the second depth of the first and second drive grooves.

9. The fan drive arrangement of claim 7 wherein the grooves in the first and second fan pulleys have a first depth with the variable pitch sheave assembly in the high speed position and a second depth with the variable pitch sheave assembly in the low speed position.

10. The fan drive arrangement of claim 9 wherein the first depth of the grooves in the first and second fan pulleys is less than the second depth of the grooves in the first and second fan pulleys.

11. A fan drive arrangement for operatively connecting a drive shaft to a fan mounted on a rotatable fan shaft, the fan generating an air flow through a radiator having coolant thereon to cool the temperature thereof; comprising:

first and second fan pulleys interconnected to the fan shaft, each fan pulley having a groove therein for receiving a corresponding fan belt;

first and second drive pulleys interconnected to the drive shaft, each drive pulley having a groove therein for receiving a corresponding drive belt;

a variable pitch sheave assembly movable between a first high speed position and a second low speed position, the variable pitch sheave including:

first and second drive belt grooves, the drive belt grooves having a first depth with the variable pitch sheave assembly in the high speed position and a second depth with the variable pitch sheave assembly in the low speed position; and first and second fan belt grooves, the fan belt grooves having a first depth with the variable pitch sheave assembly in the high speed position and a second depth with the variable pitch sheave assembly in the low speed position;

first and second drive belts seated in corresponding drive belt grooves in the variable pitch sheave assembly and in corresponding grooves in the drive pulleys to translate rotation of the drive pulleys to the variable pitch sheave assembly; and first and second fan belts seated in corresponding fan belt grooves in the variable pitch sheave assembly and in corresponding grooves in the fan pulleys to translate rotation of the variable pitch sheave assembly to the fan pulleys;

an actuator operatively connected to the variable pitch sheave assembly for moving the variable pitch sheave assembly between the high speed position and the low speed position; and a controller operatively connected to the actuator and monitoring the temperature of the coolant, the controller controlling operation of the actuator in response to the temperature of the coolant.

12. The fan drive arrangement of claim 11 wherein the variable pitch sheave assembly includes:

a rotatable sheave shaft having first and second opposite ends;

a first outer member fixed to the first end of the sheave shaft;

a second outer member fixed to the second end of the sheave shaft;

an intermediate member fixed to the sheave shaft between the first and the second ends thereof;

a first slidable member slidable along the sheave shaft between the first outer member and the intermediate member; the first slidable member and the first outer member defining the first drive belt groove therebetween and the first slidable member and the intermediate member defining the first fan belt groove therebetween; and a second slidable member slidable along the sheave shaft between the intermediate member and the second outer member; the second slidable member and the second outer member defining a second drive groove therebetween and the second slidable member and the intermediate member defining the second fan belt groove therebetween.

13. The fan drive arrangement of claim 11 wherein the first depth of the drive belt grooves is greater than the second depth of the drive belt grooves.

14. The fan drive arrangement of claim 11 wherein the first depth of the fan belt grooves is less than the second dept of the fan belt grooves.

* * * * *